D. WILLIAMS.
SUSPENSION HOOK.
APPLICATION FILED MAR. 25, 1910.

968,621.

Patented Aug. 30, 1910.

WITNESSES
A. R. Appleman
C. E. Mulreany

INVENTOR
David Williams
BY Edgar Tate & Co.
ATTORNEYS.

UNITED STATES PATENT OFFICE.

DAVID WILLIAMS, OF CARDIFF, ENGLAND.

SUSPENSION-HOOK.

968,621.     Specification of Letters Patent.     Patented Aug. 30, 1910.

Application filed March 25, 1910. Serial No. 551,573.

*To all whom it may concern:*

Be it known that I, DAVID WILLIAMS, a subject of the King of Great Britain, and residing at Cardiff, in the county of Glamorgan, Wales, England, have invented certain new and useful Improvements in Suspension-Hooks, of which the following is a specification, such as will enable those skilled in the art to which it appertains to make and use the same.

This invention relates to suspension hooks, the object thereof being to provide a device of simple and effective character adapted for employment when special safety is required.

According to this invention, a longitudinal slot is formed in the shank of the hook having a clearance space therein for the pin to rotate in. A double ended shackle is pivoted at its center in said slot of the hook by a flat or other suitably shaped pin, so formed that it will slide only in the end portions of the longitudinal slot but turn freely in the clearance space. The top end of the shackle is attached to the lifting chain or rope, and contains a stop which falls into a recess in the top of the hook when the pin is at the bottom of the longitudinal slot and acts as a guide to determine the exact position of the clearance space in which the pin rotates. The lower end of the shackle is so formed that it will be in contact with the point of the hook when the pin is at the top of the longitudinal slot, thus closing and locking the hook safely upon any gear to which it is attached. When the pin is in the bottom of the slot, the hook is still locked. To release the hook from the gear to which it is attached, raise the shackle until the stop therein is lifted out of the recess in the top of the hook, when the pin will rotate freely in the clearance space thus removing the lower end of the shackle from the point of the hook.

Figure 1:
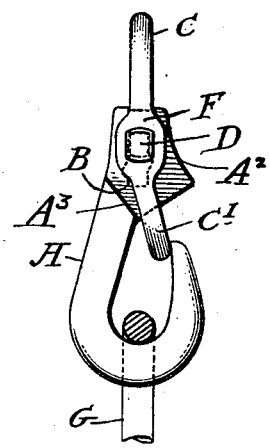
Figure 2:
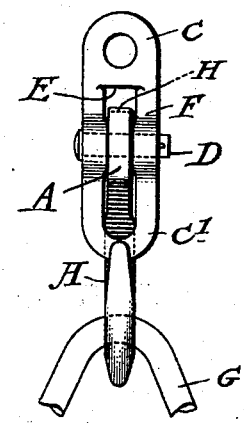

In the accompanying drawings, Figure 1 is a side elevation of the hook in its locked position; Fig. 2 a front elevation of the same; and, Fig. 3 a side elevation showing the hook free with one side of the shackle broken away.

In the practice of my invention I provide a hook A the shank of which is provided with a flattened head $A^2$ forming inclined shoulders $A^3$, and in the end of which is a recess H. I also provide a double ended shackle F which is link-shaped in form and comprises a central body portion, an upper end C and a lower end $C^1$ and the head $A^2$ of the hook A is pivoted in the shackle F on a pin D.

Figure 3:
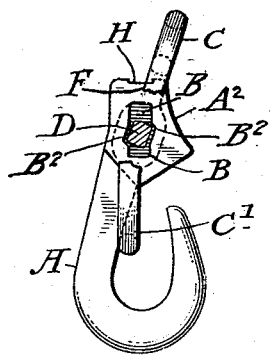

The head $A^2$ of the hook A is provided with a longitudinal slot B, the side walls of which are provided in the lower portion thereof with clearance spaces or recesses $B^2$ and the pin D is angular in cross section as clearly shown in Fig. 3.

When the weight to be suspended is on the hook A, said weight being connected with said hook by a suitable gear or link G, the pin D is in the top of the slot B, and the shackle is locked with the lower end portion $C^1$ in contact with the point of the hook A as shown in Fig. 1 thus closing said hook as shown in said figure. The upper end wall E of the link-shaped shackle forms a stop which rests in the recess H in the head $A^2$ of the hook when said shackle is locked in unloaded position, and to release the link or gear G when the strain is taken off of the hook A, the shackle F is raised by means of the upper end portion C thereof until the stop E is left out of the recess H when the pin D will be opposite the clearance space or recesses $B^2$ in the sides of the slot B, and the lower end $C^1$ of the shackle may be moved inwardly as shown in Fig. 3 so as to open the hook A, at which time the gear or link G may be removed from said hook.

Having fully described my invention, what I claim as new, and desire to secure by Letters Patent, is;—

A suspension device of the class specified, comprising a hook, the shank of which is provided with a flattened head, in the end of which is a recess, said head being also provided with a longitudinal slot, the side walls of which are provided in the lower end portion thereof with clearance spaces or recesses, a link-shaped shackle in which the head of the hook is pivoted, said shackle comprising a central body portion, an upper end portion and a lower end portion, the sides of the body portion of the shackle being provided with angular openings and a pivot pin which passes through said openings and also through the slot in the head of the hook, said pivot pin being also angular in cross section, the lower end of the shackle being adapted to operate in connection with the point of the hook and the upper end portion thereof in connection with the recess in the end of the head of the hook.

In testimony that I claim the foregoing as my invention I have signed my name in presence of the subscribing witnesses this fifteenth day of March, 1910.

DAVID WILLIAMS.

Witnesses:
   WILLIAM J. FIELD,
   FREDERICK CHARLES MOSS.